US007558839B1

(12) United States Patent
McGovern

(10) Patent No.: US 7,558,839 B1
(45) Date of Patent: Jul. 7, 2009

(54) READ-AFTER-WRITE VERIFICATION FOR IMPROVED WRITE-ONCE-READ-MANY DATA STORAGE

(75) Inventor: William P. McGovern, San Jose, CA (US)

(73) Assignee: Netapp, Inc., Sunnyvale, CA (US)

( * ) Notice: Subject to any disclaimer, the term of this patent is extended or adjusted under 35 U.S.C. 154(b) by 722 days.

(21) Appl. No.: 11/227,812

(22) Filed: Sep. 14, 2005

Related U.S. Application Data

(60) Provisional application No. 60/636,444, filed on Dec. 14, 2004.

(51) Int. Cl.
*G06F 15/16* (2006.01)
*G11B 5/02* (2006.01)

(52) U.S. Cl. ........................................ 709/218; 360/53

(58) Field of Classification Search ................ 709/218, 709/217; 707/200; 360/53
See application file for complete search history.

(56) References Cited

U.S. PATENT DOCUMENTS 4,635,145 A 1/1987 Horie et al.
4,727,512 A 2/1988 Birkner et al.
4,775,969 A 10/1988 Osterlund
5,235,695 A 8/1993 Pence
5,269,022 A 12/1993 Shinjo et al.
5,297,124 A 3/1994 Plotkin et al.
5,438,674 A 8/1995 Keele et al.
5,455,926 A 10/1995 Keele et al.
5,485,321 A 1/1996 Leonhardt et al.
5,666,538 A 9/1997 DeNicola
5,673,382 A 9/1997 Cannon et al.
5,774,292 A 6/1998 Georgiou et al.
5,774,715 A 6/1998 Madany et al.
5,805,864 A 9/1998 Carlson et al.
5,809,511 A 9/1998 Peake (Continued)

FOREIGN PATENT DOCUMENTS

CA 2 256 934 A1 6/2000

(Continued)

OTHER PUBLICATIONS

Hatfield, Jim, "Write Read Verify" Feature Set, e04129r0, May 14, 2004.*

(Continued)

*Primary Examiner*—Joon H Hwang
*Assistant Examiner*—Jasmine Myers
(74) *Attorney, Agent, or Firm*—Perkins Coie LLP

(57) ABSTRACT

A user interface in a file-based networked storage server enables a user to selectively enable or disable an option to require read-after-write verification for sets of data stored by the file-based networked storage server. In response to a request from a client, specified data is written to a magnetic storage device managed by the file-based networked storage server. A determination is made of whether the specified data is associated with a set of data for which the option to require read-after-write verification is enabled, and if so, then the specified data written to the magnetic storage device is verified, prior to, and as a precondition of, acknowledging completion of the write to the client. The specified data written to the magnetic storage device is designated as being in a WORM state only after successful completion of said writing and said verifying.

21 Claims, 4 Drawing Sheets

U.S. PATENT DOCUMENTS 5,809,543 A 9/1998 Byers et al.
5,854,720 A 12/1998 Shrinkle et al.
5,857,208 A 1/1999 Ofek
5,864,346 A 1/1999 Yokoi et al.
5,872,669 A 2/1999 Morehouse et al.
5,875,479 A 2/1999 Blount et al.
5,911,779 A 6/1999 Stallmo et al.
5,949,970 A 9/1999 Sipple et al.
5,961,613 A 10/1999 DeNicola
5,963,971 A 10/1999 Fosler et al.
6,021,408 A 2/2000 Ledain et al.
6,023,709 A 2/2000 Anglin et al.
6,029,179 A 2/2000 Kishi
6,041,329 A 3/2000 Kishi
6,044,442 A 3/2000 Jesionowski
6,049,848 A 4/2000 Yates et al.
6,061,309 A 5/2000 Gallo et al.
6,067,587 A 5/2000 Miller et al.
6,070,224 A 5/2000 LeCrone et al.
6,098,148 A 8/2000 Carlson
6,128,698 A 10/2000 Georgis
6,131,142 A 10/2000 Kamo et al.
6,131,148 A 10/2000 West et al.
6,134,660 A 10/2000 Boneh et al.
6,163,856 A 12/2000 Dion et al.
6,173,293 B1 1/2001 Thekkath et al.
6,173,359 B1 1/2001 Carlson et al.
6,195,730 B1 2/2001 West
6,225,709 B1 5/2001 Nakajima et al.
6,247,096 B1 6/2001 Fisher et al.
6,260,110 B1 7/2001 LeCrone et al.
6,266,784 B1 7/2001 Hsiao et al.
6,269,423 B1 7/2001 Kishi
6,269,431 B1 7/2001 Dunham
6,282,609 B1 8/2001 Carlson
6,289,425 B1 9/2001 Blendermann et al.
6,292,889 B1 9/2001 Fitzgerald et al.
6,301,677 B1 10/2001 Squibb
6,304,880 B1 10/2001 Kishi
6,317,814 B1 11/2001 Blendermann et al.
6,324,497 B1 11/2001 Yates et al.
6,327,418 B1 12/2001 Barton
6,336,163 B1 1/2002 Brewer et al.
6,336,173 B1 1/2002 Day, III et al.
6,339,778 B1 1/2002 Kishi
6,341,329 B1 1/2002 LeCrone et al.
6,343,342 B1 1/2002 Carlson
6,353,837 B1 3/2002 Blumenau
6,360,232 B1 3/2002 Brewer et al.
6,389,503 B1 5/2002 Georgis et al.
6,397,307 B2 5/2002 Ohran
6,408,359 B1 6/2002 Ito et al.
6,487,561 B1 11/2002 Ofek et al.
6,496,791 B1 12/2002 Yates et al.
6,499,026 B1 12/2002 Rivette et al.
6,557,073 B1 4/2003 Fujiwara et al.
6,557,089 B1 4/2003 Reed et al.
6,578,120 B1 6/2003 Crockett et al.
6,615,365 B1 9/2003 Jenevein et al.
6,625,704 B2 9/2003 Winokur et al.
6,654,912 B1 11/2003 Viswanathan et al.
6,658,435 B1 12/2003 McCall et al.
6,694,447 B1 2/2004 Leach et al.
6,725,331 B1 4/2004 Kedem
6,766,520 B1 7/2004 Rieschl et al.
6,779,057 B2 8/2004 Masters et al.
6,779,058 B2 8/2004 Kishi et al.
6,779,081 B2 8/2004 Arakawa et al.
6,816,941 B1 11/2004 Carlson et al.
6,816,942 B2 11/2004 Okada et al.
6,834,324 B1 12/2004 Wood
6,850,964 B1 2/2005 Brough et al.
6,877,016 B1 4/2005 Hart et al.
6,898,600 B2 5/2005 Fruchtman et al.
6,915,397 B2 7/2005 Lubbers et al.
6,931,557 B2 8/2005 Togawa et al.
6,950,263 B2 9/2005 Suzuki et al.
6,973,534 B2 12/2005 Dawson et al.
6,978,283 B1 12/2005 Edwards et al.
6,978,325 B2 12/2005 Gibble et al.
7,007,043 B2 2/2006 Farmer et al.
7,020,779 B1 3/2006 Sutherland
7,032,126 B2 4/2006 Zalewski et al.
7,055,009 B2 5/2006 Factor et al.
7,096,331 B1 8/2006 Haase et al.
7,100,089 B1 8/2006 Phelps
7,111,136 B2 9/2006 Yamagami
7,111,194 B1 9/2006 Schoenthal et al.
7,127,388 B2 10/2006 Yates et al.
7,152,078 B2 12/2006 Yamagami
7,155,465 B2 12/2006 Lee et al.
7,155,586 B1 12/2006 Wagner et al.
7,200,726 B1 4/2007 Gole et al.
7,203,726 B2 4/2007 Hasegawa
7,346,623 B2 3/2008 Prahlad et al.
2002/0004835 A1 1/2002 Yarbrough
2002/0016827 A1 2/2002 McCabe et al.
2002/0026595 A1 2/2002 Saitou et al.
2002/0091670 A1 7/2002 Hitz et al.
2002/0095557 A1 7/2002 Constable et al.
2002/0144057 A1 10/2002 Li et al.
2002/0166079 A1 11/2002 Ulrich et al.
2002/0199129 A1 12/2002 Bohrer et al.
2003/0004980 A1 1/2003 Kishi et al.
2003/0005313 A1 1/2003 Gammel et al.
2003/0025800 A1 2/2003 Hunter et al.
2003/0037211 A1 2/2003 Winokur
2003/0046260 A1 3/2003 Satyanarayanan et al.
2003/0120676 A1 6/2003 Holavanahalli et al.
2003/0126136 A1 7/2003 Omoigui
2003/0126388 A1 7/2003 Yamagami
2003/0135672 A1 7/2003 Yip et al.
2003/0149700 A1 8/2003 Bolt
2003/0158766 A1 8/2003 Mital et al.
2003/0182350 A1 9/2003 Dewey
2003/0188208 A1 10/2003 Fung
2003/0225800 A1 12/2003 Kavuri
2004/0015731 A1 1/2004 Chu et al.
2004/0098244 A1 5/2004 Dailey et al.
2004/0103147 A1 5/2004 Flesher et al.
2004/0167903 A1 8/2004 Margolus et al.
2004/0168034 A1 8/2004 Homma et al.
2004/0181388 A1 9/2004 Yip et al.
2004/0181707 A1 9/2004 Fujibayashi
2004/0186858 A1* 9/2004 McGovern et al. .......... 707/200
2005/0010529 A1 1/2005 Zalewski et al.
2005/0044162 A1 2/2005 Liang et al.
2005/0063374 A1 3/2005 Rowan et al.
2005/0065962 A1 3/2005 Rowan et al.
2005/0066118 A1 3/2005 Perry et al.
2005/0066225 A1 3/2005 Rowan et al.
2005/0076070 A1 4/2005 Mikami
2005/0076261 A1 4/2005 Rowan et al.
2005/0076262 A1 4/2005 Rowan et al.
2005/0076264 A1 4/2005 Rowan et al.
2005/0097260 A1 5/2005 McGovern et al.
2005/0108302 A1 5/2005 Rand et al.
2005/0144407 A1 6/2005 Colgrove et al.
2005/0182910 A1 8/2005 Stager et al.
2005/0240813 A1 10/2005 Okada et al.
2006/0010177 A1 1/2006 Kodama
2006/0047895 A1 3/2006 Rowan et al.
2006/0047902 A1 3/2006 Passerini
2006/0047903 A1 3/2006 Passerini

| | | | |
|---|---|---|---|
| 2006/0047905 | A1 | 3/2006 | Matze et al. |
| 2006/0047925 | A1 | 3/2006 | Perry |
| 2006/0047989 | A1 | 3/2006 | Delgado et al. |
| 2006/0047998 | A1 | 3/2006 | Darcy |
| 2006/0047999 | A1 | 3/2006 | Passerini et al. |
| 2006/0143376 | A1 | 6/2006 | Matze et al. |
| 2006/0143476 | A1 | 6/2006 | McGovern |
| 2006/0259160 | A1 | 11/2006 | Hood et al. |

FOREIGN PATENT DOCUMENTS

| | | | |
|---|---|---|---|
| EP | 0 845 733 | A2 | 6/1998 |
| EP | 0 869 460 | A2 | 10/1998 |
| EP | 1 058 254 | A2 | 12/2000 |
| EP | 1 122 910 | A1 | 8/2001 |
| EP | 1 233 414 | A2 | 8/2002 |
| EP | 1333379 | A2 | 8/2003 |
| EP | 1671231 | | 6/2006 |
| WO | WO-9906912 | | 2/1999 |
| WO | WO-9903098 | | 11/1999 |
| WO | WO 01/18633 | A1 | 3/2001 |
| WO | WO-0118633 | A1 | 3/2001 |
| WO | WO 03/067438 | A2 | 8/2003 |
| WO | WO-03067438 | A2 | 8/2003 |
| WO | WO 2004/084010 | A2 | 9/2004 |
| WO | WO-2004084010 | A2 | 9/2004 |
| WO | WO-2005031576 | A2 | 4/2005 |
| WO | WO-2006023990 | A2 | 3/2006 |
| WO | WO-2006023991 | A2 | 3/2006 |
| WO | WO-2006023992 | A2 | 3/2006 |
| WO | WO-2006023993 | A2 | 3/2006 |
| WO | WO-2006023994 | A1 | 3/2006 |
| WO | WO-2006023995 | A2 | 3/2006 |

OTHER PUBLICATIONS

Novell, Inc., NetWare Server Disks and Storage Devices Administration Guide, Netware 5.1, Jan. 2000.*

U.S. Appl. No. 11/051,794, filed Feb. 4, 2005, Method and Apparatus for Managing Backup Data.

U.S. Appl. No. 11/339,979, filed Jan. 25, 2006 Method and Apparatus to Automatically Commit Files to Worm Status Office Action dated May 1, 2008 and Oct. 20, 2008.

U.S. Appl. No. 11/227,813, filed Sep. 14, 2005 Disk Sanitization in an Active File System Office Action dated Jun. 6, 2008.

U.S. Appl. No. 11/051/792, filed Feb. 4, 2005 Method and System for Browsing Objects on a Protected Volume in a Continuous Data Protection System Office Action dated May 21, 2008.

U.S. Appl. No. 11/051,793, filed Feb. 4, 2005 Method and System for Backing Up Data Office Action dated Aug. 15, 2008.

U.S. Appl. No. 11/413,327, filed Apr. 28, 2006 Method and System for Remote Data Recovery Office Action dated Sep. 3, 2008.

U.S. Appl. No. 11/051,794, filed Feb. 4, 2005 Method and Apparatus for Managing Backup Data Office Action dated May 7, 2008.

U.S. Appl. No. 11/051,952, filed Feb. 4, 2005 Method and Apparatus for Deleting Data Upon Expiration Office Action dated Jun. 13, 2008 and Nov. 28, 2008.

"Alacritus Announces Disk-Based Successor to Tape", Knapp Comm., Aug. 21, 2002.

"Alacritus Creates 'Next Critical Step' in Disaster Recovery for Patrick Air Force Base, Securitus VTL Sets the Pace", Apr. 20, 2004.

"Alacritus to Demo Chronospan Continuous Data Protection with the Cisco MDS 9000", Apr. 1, 2004.

"Alacritus, Hitachi CP and Nissho Team to Create Virtual Tape Library Appliance: Industry's First Virtual Tape Library Appliance to Replace Storage Tape Libraries", Alacritus Software, Inc., Jun. 25, 2001.

"Alacritus, Hitachi CP and Nissho Team to Create Virtual Tape Library" internetnews.com, Jun. 25, 2001.

"Alacritus and Network Appliance Deliver Advanced Virtual Tape Library, Solution Shortens Backup Windows, Accelerates Data Recovery, and Simplifies Backup Management", Dec. 7, 2004.

"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup Performance and Scalability", Alacritus Software, Jul. 8, 2002.

"Alacritus Software Announces Securitus I, The Industry's First Virtual Tape Library Solution: Securitus I Hearlds Advent of 'Disruptive Technology' that Serves as Replacement to Tape Libraries", Alacritus Software, Inc. Jun. 25, 2001.

"Alacritus Software Announces Securitus I, The Industry's First Virtual Tape Library Solution: Securitus I Hearlds Advent of 'Disruptive Technology' that Serves as Replacement to Tape Libraries", Alacritus Software, Inc. Apr. 9, 2002.

"Alacritus Software Announces Virtual Tape Library Support for Legato Networker Data Protection Solution", Alacritus Software, Inc., Jan. 8, 2002.

"Alacritus Software's Chronospan: Make Time for Continuous Data Protection", Aberdeen Group, Inc., Oct. 2003.

"Alacritus Software FAQs" Alacritus Software, Inc. Jul. 2001.

"Alacritus Software's Securitus: Defining the Way to Virtual Tape Libraries", Aberdeen Group, Inc. Jul. 2003.

"Alacritus Software's Securitus I: Pointing the Way to Virtual Tape Libraries" Aberdeen Group, Inc. Mar. 2002.

Baltazar, Henry "More Intelligence is on the Way" eWEEK, Sep. 15, 2003.

Baltazar, Henry "Weaving Apps into SAN Fabric" eWEEK, Mar. 24, 2003.

Barrett, Alex, "The Case for Network Smarts", Storage Magazine, Jun. 2003.

Biggar, Heidi, "Alacritus Enables Disk-Based Backup", InfoStor, Sep. 2001.

Biggar, Heidi, "Disk and Tape Forge New Partnerships in backup Arena" InfoStor, Nov. 2001.

Camphusein, Alicia, "Hitachi Inks OEM Deal with Legato", Knapp Comm., Jul. 2002.

"Case Study Shizuoka-ken Noukyou Densan Center K.K., Reducing Management Costs Through Tapeless Backup At An iDC", Apr. 7, 2004.

"Chronospan" Alacritus Website, Oct. 2003.

"Cisco and Storage ISVs to Demo Protocol-Based Interface between Storage Appliances and the Cisco MDS 9000", Mar. 30, 2004.

"Continuous Data Protection: Business Continuity for the Era of Networked Storage: An Executive White Paper", Aberdeen Group, Inc., Jul. 2003.

"Customer Success" Alacritus Website, Oct. 2003.

Joan Daemen et al., "AES Proposal: Rijndael", The Rijndael Block Cipher, Document Version 2, Mar. 9, 1999, 45 pages.

Joan Daemen et al., "Note on Naming", Rijndael, Sep. 4, 2003, 2 pages.

Decru, "Decru Datafort E-Series Storage Security Appliances, Transparent Data Security for Network Attached Storage (NAS)", 2004. 2 pages.

"Disk-Based Data Protection" Alacritus Software, Inc., Jul. 2001.

"Disk-Based Data Protection" Alacritus Software, Inc., Sep. 2001.

"Disk-Based Data Protection" Alacritus Software, Inc., Sep. 2002.

Simon L. Garfinkel et al., "Rememberance of Data Passed: A Study of Disk Sanitization Practices", IEEE Security and Privacy, vol. 1, No. 1, 2003 19 pages.

Hill, David "Alacritus Software's Securitus: Defining the Way to Virtual Taped Libraries" Aberdeen Group, Inc. Jul. 2003.

"Hitachi CP, Nissho, and Alacritus Software Bring Virtual Tape Library Appliance Solution to Market: Three Companies Join to Deliver VTLA Smart Guard—A Disk Subsystem Product that Functions as a Virtual Storage Tape Library", Alacritus Software, Inc., Oct. 3, 2001.

Komeiga, Kevin, "Vendor Pushes Disk Backup Over Tape" SearchStorage.com, Jan. 10, 2003.

Chris Lueth, "WORM Storage on Magnetic Disks Using SnapLock Compliance™ and SnapLock Enterprise™", Network Applicance, Inc., Sep. 2003, sections 1-5 13 pages.

"Manageability: Securitus v. Tape", Alacritus Website, Oct. 2003.

Microsoft Windows XP, released 2001.

"Network Appliance WORM Storage Solution: SEC 17 a-4(f) Compliance Assessment", Network Appliance, Inc., Jul. 10, 2003, pp. i-20.

"No Changes Required: Securitus v. Tape" Alacritus Website, Oct. 2003.
Payack, Paul JJ, "Alacritus Lines Up OEM Partners for Virtual Tape Library Push" The (451) Storage & Systems, Oct. 4, 2002.
Payack, Paul JJ, "Alacritus Software Announces Continuous Data Protection with New Chronospan Technology" Oct. 28, 2003.
Payack, Paul JJ "Alacritus Software Announces New Customers for Securitus VTLA", Alacritus Software, Inc. Jan. 13, 2004.
Preston, W. Curtis, "Surprise! Cheap Disks Cure Slow Backup", Storage Magazine, Jun. 1, 2002.
"Product Brief: Rhapsody/Alacritus-Securitus/Xpath Virtual Tape in the Fabric", The Enterprise Storage Group, Aug. 2002.
"Scalability: Securitus v. Tape", Alacritus Website, Oct. 2003.
"Seamless Integration", Alacritus Website, Oct. 2003.
"Securitus", Alacritus Website, Oct. 2003.
"Securitus I White Paper: Disk Based Data Protection from Alacritus Software" Alacritus Software, Inc. Jul. 2001.
"Securitus White Paper: Disk Based Data Protection from Alacritus Software", Alacritus Website, Oct. 2003.
"Strengths: Securitus v. Tape", Alacritus Website, Oct. 2003.
"Testimonials", Alacritus Website, Oct. 2003.
"The SNIA Data Management Forum Created to Tackle Data Protection and Information Lifecycle Management Issues: Enhanced Backup Solutions Initiative Rolls Efforts into New SNIA Forum" Storage Networking Industry Association, Oct. 13, 2003.
"Topologies", Alacritus Website, Oct. 7, 2003.
Trimmer, Don "Tape Free Backup/Recovery: Requirements and Advantages: Virtualization Technology Will Encompass Many Applications, One of the Most Significant Possibly Being Backup/Recovery", InfoStor, Mar. 2002.
"Virtual Tape Library Technology Brochure", Alacritus Software Inc., Jul. 2001.
U.S. Appl. No. 11/227,329, filed Sep. 14, 2005 Inventor: McGovern, et al. Method and Apparatus for Verifiably Migrating WORM Data.
U.S. Appl. No. 11/295,214, filed Dec. 5, 2005 Inventor: McGovern, et al. Disk Sanitization Using Encryption.
U.S. Appl. No. 11/051,862, filed Feb. 4, 2005 Inventor: Stager, et al. Method and System for Adding Redundancy to a Continuous Data Protection System.
U.S. Appl. No. 11/833,515, filed Aug. 3, 2007 Inventor: Stager, et al. Method and System for Storing Data Using a Continuous Data Protection System.
U.S. Appl. No. 12/040,276, filed Feb. 29, 2008 Inventor: Stager, et al. Method and System for Restoring a Volume in a Continuous Data Protection System.
U.S. Appl. No. 10/933,005 filed: Sep. 1, 2004 Inventor: Manley, et al. Title: Method and Apparatus for Maintaining Compliant Storage.
U.S. Appl. No. 10/933,005, entitled, "Method And Apparatus For Maintaining Compliant Storage," filed Sep. 1, 2004, of Stephen Manley et al.
U.S. Appl. No. 10/932,683, entitled, "Method And Apparatus For Mirroring Non-Compliant Storage To Compliant Storage," filed Sep. 1, 2004, of William McGovern et al.
U.S. Appl. No. 11/339,979, entitled, "Method And Apparatus To Automatically Commit Files To Worm Status," filed Jan. 25, 2006, of Jeffrey Merrick et al.
U.S. Appl. No. 11/227,813, entitled, "Disk Sanitization In An Active File System," filed Sep. 14, 2005, of William McGovern.
U.S. Appl. No. 11/227,329, entitled, "Method And Apparatus For Verifiably Migrating WORM Data," filed Sep. 14, 2005, of William McGovern et al.
Simon L. Garfinkel et al., "Remembrance of Data Passed: A Study of Disk Sanitization Practices", IEEE Security and Privacy, vol. 1, No. 1, 2003, 19 pages.

* cited by examiner

READ-AFTER-WRITE VERIFICATION FOR IMPROVED WRITE-ONCE-READ-MANY DATA STORAGE

This application claims the benefit of U.S. Provisional Patent application No. 60/636,444, filed on Dec. 14, 2004 and entitled, "A Method and An Apparatus to Perform Read-after-Write Verification for Improved Write-Once-Read-Many Systems," which is incorporated herein by reference.

FIELD OF INVENTION

The present invention relates to networked data storage systems, and more particularly, to performing verification in a write-once-read-many (WORM) system.

BACKGROUND

A networked data storage system may include one or more network storage servers, which may be storage appliances. A network storage server may provide services related to the organization of data on storage devices, such as disks. Some of these network storage servers are commonly referred to as filers or file servers. An example of such a storage server is any of the Filer products made by Network Appliance, Inc. in Sunnyvale, Calif. The storage appliance may be implemented with a special-purpose computer or a general-purpose computer. Depending on the application, various networked data storage systems may include different numbers of storage servers.

For financial institutions in the United States, such as security broker firms, security dealers, etc., the Security and Exchange Commission (SEC) imposes additional requirements on the data storage systems of these institutions for regulation and rule enforcement purposes. One of these rules is in 17 C.F.R. § 240.17a-4(f) adopted on Feb. 12, 1997, hereinafter, the "Rule." The Rule imposes certain criteria on electronic storage media used in the securities broker-dealer industry. Under the Rule, a storage system has to provide non-rewriteability and non-eraseability, in addition to other requirements. When the Rule was developed, the prevalent storage media used in the securities broker-dealer industry was write once read many (WORM) optical disks. The WORM optical disks generally allow immediate verification of the accuracy of the recording process as an integral part of writing a record to the optical disks. Typically, a WORM optical disk immediately reads back the written sectors related to the record in a second revolution of the optical disk and compares what is read with what was intended to be written. If an error is detected, the recording process is retried in another location on the disk.

However, as data storage technology advances, magnetic storage devices, such as magnetic disks, have become the preferred storage devices over optical disks. Advantages of magnetic storage devices include their generally higher capacity and lower cost than optical storage. Another advantage is the shorter time needed to retrieve data from the magnetic storage devices, because optical disks generally take a relatively long time to load (e.g., from an optical silo) before they can be searched. Magnetic storage devices also provide fast random access. Since a regulatory agency may allow a financial institution only a very short time period to respond to a discovery request, it is important to have fast random access to the stored data. Moreover, it is relatively easy and economical to replicate the data stored in a magnetic storage device and to store the copy in another location using replication solutions, such as SnapMirror® from Network Appliance, Inc. The ease in replication facilitates disaster recovery of the data storage system.

Because of the various advantages of magnetic storage devices, it is desirable to use magnetic storage devices in the data storage systems in the securities broker-dealer industry as well. Techniques have been developed to make magnetic storage devices comply with the rules promulgated by SEC. In particular, a WORM storage solution applicable to magnetic storage devices has been developed by Network Appliance, Inc. The WORM storage solution allows for verification of accuracy at the time each record is read and periodically during the storage life of the record. However, since the data written is not verified until the record is read, there is some latency in discovering a problem with the data written. Furthermore, the periodic verification capability essentially transfers the responsibility for the timing of verifying the accuracy with which the recording was done to the system administrator, who then chooses the frequency and the immediacy with which the verification is performed. In addition to burdening the system administrator with the responsibility, the reliability of the storage system may be compromised if the frequency of verification is set too low. On the other hand, the performance of the system may suffer if the frequency of the verification is set too high.

SUMMARY

A user interface is provided in a file-based networked storage server, to enable a user to selectively enable or disable an option to require read-after-write verification for each of a plurality of sets of data stored by the file-based networked storage server. A request is received from a client to perform a write of specified data, and in response to the request, the specified data is written to a magnetic storage device managed by the file-based networked storage server. A determination is made of whether the specified data is associated with a set of data for which the option to require read-after-write verification is enabled, and if so, then the specified data written to the magnetic storage device is verified, prior to, and as a precondition of, acknowledging completion of the write to the client. The specified data written to the magnetic storage device is designated as being in a WORM state only after successful completion of said writing and said verifying.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus to perform read-after-write verification for improved WORM data storage are described. As described further below, a user interface is provided in a file-based networked storage server, to enable a user to selectively enable or disable an option to require read-after-write verification for each of a plurality of sets of data stored by the file-based networked storage server. A request is received from a client to perform a write of specified data, and in response to the request, the specified data is written to a magnetic storage device managed by the file-based networked storage server. A determination is made of whether the specified data is associated with a set of data for which the option to require read-after-write verification is enabled, and if so, then the specified data written to the magnetic storage device is verified, prior to, and as a precondition of, acknowledging completion of the write to the client. The specified data written to the magnetic storage device is designated as being in a WORM state only after successful completion of said writing and said verifying.

Figure 1:
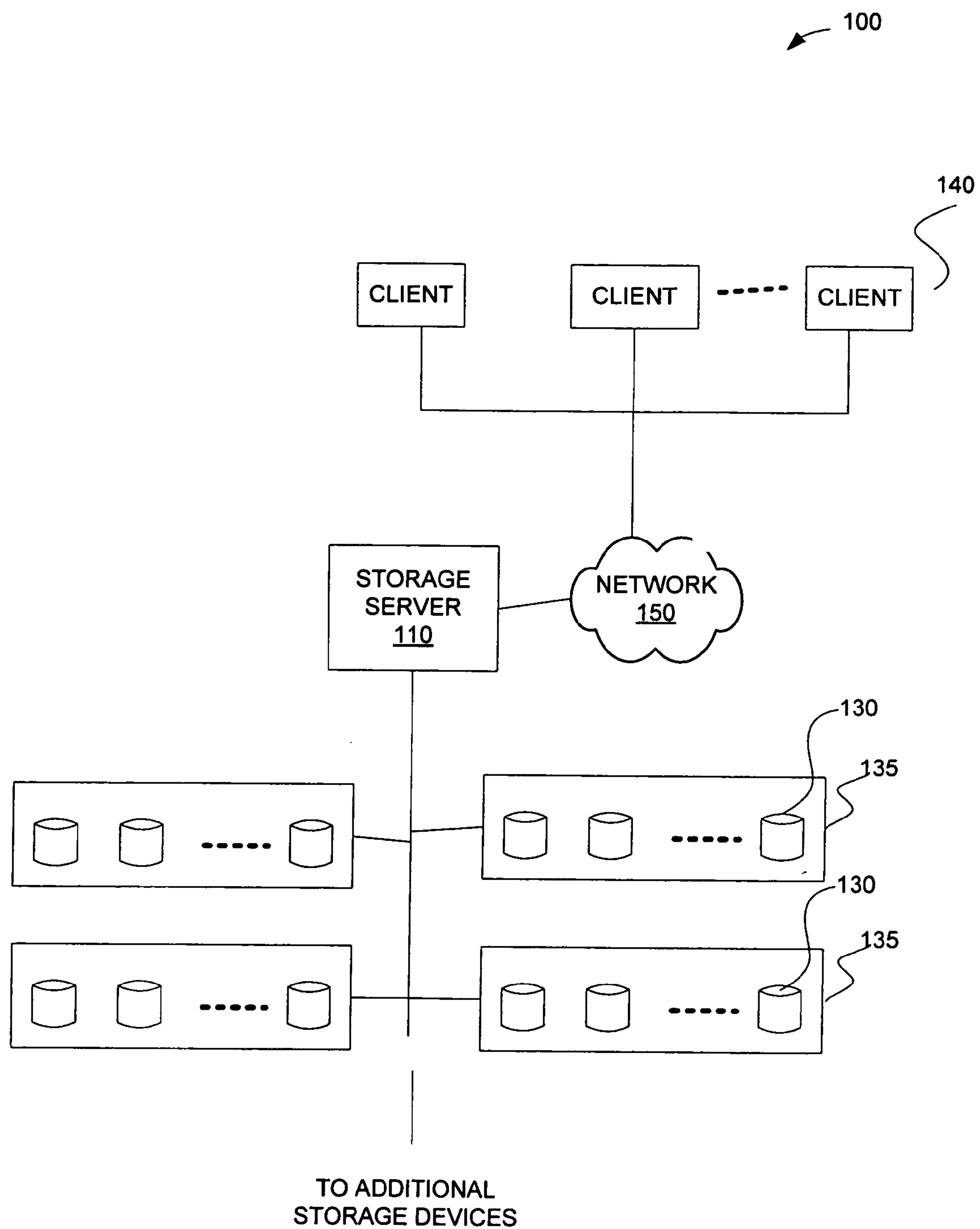
FIG. 1 illustrates an exemplary embodiment of a networked storage system.

FIG. 1 shows a networked storage system useable with some embodiments of the present invention. The system 100 includes a storage server 110, a network 150, a number of storage devices 130 coupled to the storage server 110, and a number of client machines 140 coupled to the storage server 110 via the network 150. The network 150 may include a wide area network (WAN), a local area network (LAN), etc. The storage devices 130 may be magnetic disks organized into volumes 135. The volumes 135 may include one or more Redundant Array of Independent Disks (RAID) volumes.

In one embodiment, data is stored and transferred in units of files in the system 100. Therefore, the system 100 may be referred to as a file-based networked storage system. In one embodiment, the system 100 is a network-attached storage (NAS) system, in which the storage server 110 provides clients 140 with file-level access to data stored in the volumes 135. The NAS system uses file access protocols to retrieve data, such as, for example, Network File System (NFS), or Common Internet File System (CIFS). The NAS system may be implemented in a single server or in multiple servers. The files are logically arranged into directories. A volume may be mapped to one or more directories. Alternatively, the system 100 may include a storage area network (SAN) to transmit read/write requests at the block level of the storage server 110. A block is the basic unit used to store data in the SAN.

In some embodiments, each of the volumes may be independently set up to have read-after-write verification enabled or disabled, according to user preference. Data written to a volume with the option enabled will be automatically verified after a write operation, before completion of the write is acknowledged to the client. In certain embodiments, after a complete record (e.g., a file) is written in its entirety, the data is verified by reading it back from the storage device(s) on which it was written and comparing the data read back to the data that was requested to be written. Once the written data is verified, the data is designated as non-rewriteable and non-erasable for a predetermined retention period (i.e., WORM state) in accordance with the Rule. The data may still be read many times within the retention period. Thus, the volume essentially implements a write once read many (WORM) scheme to store the data. Details on how the read-after-write verification is performed are discussed below.

Note that any or all of the components of system 100 and associated hardware may be used in various embodiments of the present invention. However, it can be appreciated that other configurations of the networked data storage system may include some or all of the devices disclosed above.

Figure 2A:
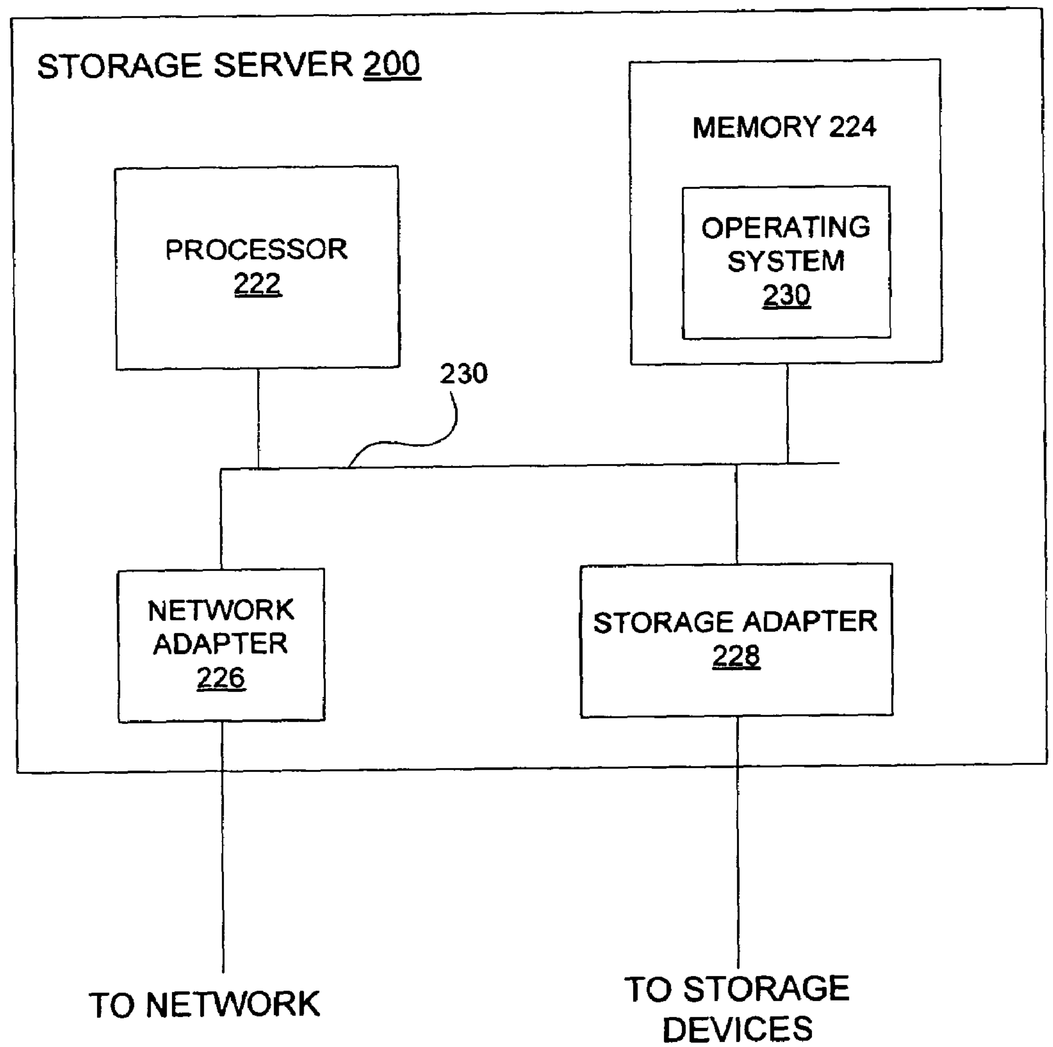
FIG. 2A illustrates one embodiment of a storage server.

Details of an embodiment of the storage server 110 are illustrated in FIG. 2A. In the illustrated embodiment, the storage server 200 includes a processor 222, a memory 224, a network adaptor 226, and a storage adaptor 228, which are coupled to each other via an interconnect 230. In one embodiment, the storage server 200 is within a network and the network adaptor 226 interfaces with the network. The network may include a local area network (LAN), a wide area network (WAN), a Global Area Network (GAN) such as the Internet, etc. Data is transmitted between the storage server 200 and the network via the network adaptor 226. When data is received, the network adaptor 226 may forward the data to the storage adaptor 228, the memory 224, or the processor 222.

In one embodiment, the processor 222 reads instructions from the memory 224 and executes the instructions. The memory 224 may include any of various types of memory devices, such as, for example, random access memory (RAM), read-only memory (ROM), flash memory, one or more mass storage devices (e.g., disks), etc. In one embodiment, the memory 224 stores instructions of an operating system 230. The processor 222 may retrieve the instructions from the memory 224 to run the operating system 230. The processor 222 responds to requests from client machines (e.g., the clients 140 in FIG. 1), a network management station, or other storage servers and organizes data on the storage devices (e.g., magnetic disks) coupled to the storage server 200. The storage server 200 interfaces with the storage devices via the storage adaptor 228.

Figure 2B:
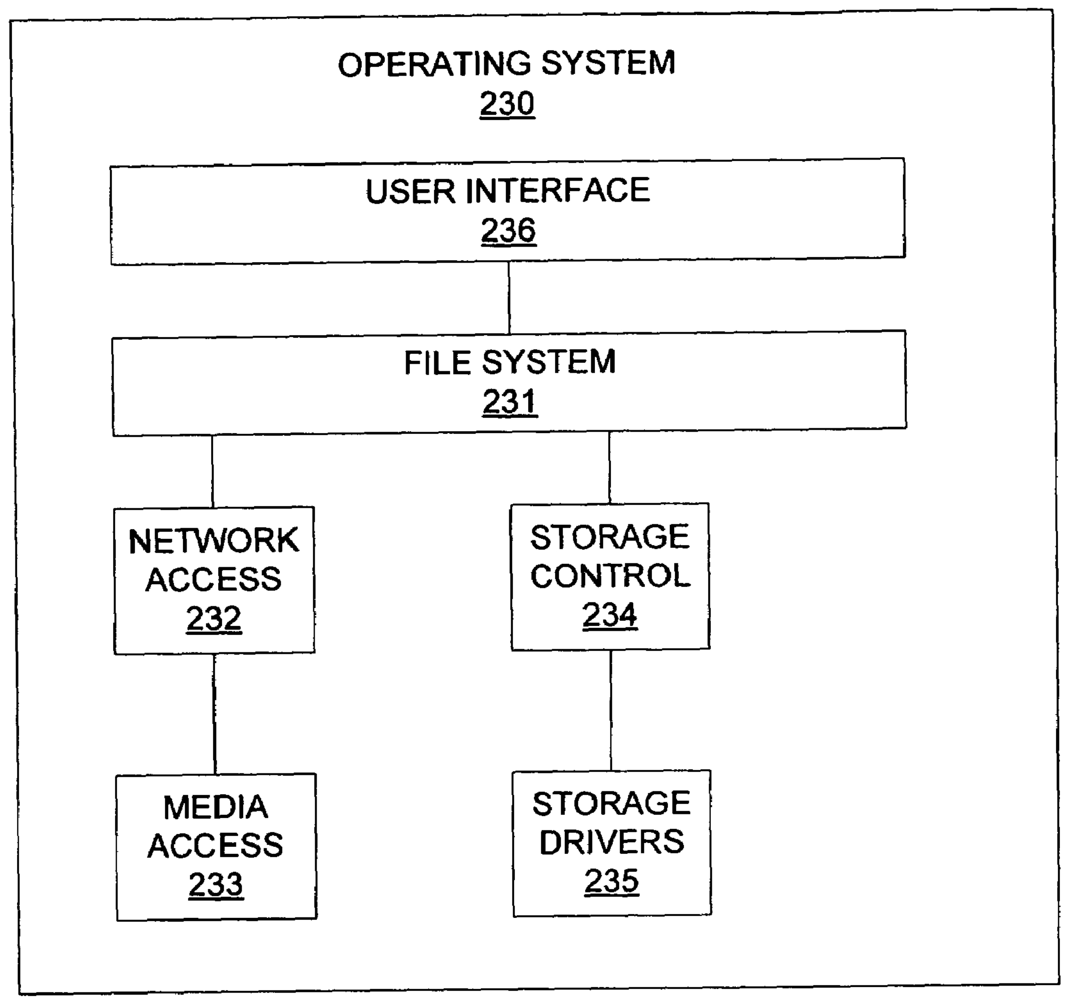
FIG. 2B illustrates one embodiment of an operating system of a storage server.

FIG. 2B illustrates the operating system 230 in greater details according to one embodiment of the invention. The operating system 230 includes a file system 231, a network access layer 232, a media access layer 233, a storage control module 234, and a set of storage drivers 235. Note that different embodiments of the operating system 230 may include more or fewer modules and/or components than those shown in FIG. 2B.

In one embodiment, the file system 231 is a programmatic entity that imposes structure on an address space of the storage devices (e.g., the storage devices 130 in FIG. 1) of the storage server 200. This enables the storage server 200 to conveniently handle data containers, such as files and blocks. The file system 231 executes read and write operations on the storage devices in response to client requests, maintain directories of stored data, etc. For some predetermined volumes and/or operations, the file system 231 causes read-after-write verification to verify the data is written correctly. More details of the read-after-write verification are described below with reference to FIG. 3.

The file system 231 is logically coupled to the network access layer 232 and the associated media access layer 233. The network access layer 232 and the media access layer 233 allow the storage server 200 to communicate over a network (e.g., the network 150 in FIG. 1) with other devices within the system, such as clients and/or other storage servers. The network access layer 232 may implement any of various protocols, such as Network File System (NFS), Common Internet File System (CIFS), and/or Hypertext Transfer Protocol (HTTP). The media access layer 233 includes one or more drivers that implement one or more protocols to communicate over the network, such as Ethernet.

The file system 231 is also logically coupled to the storage control module 234 and the storage drivers 235. The storage control module 234 and the storage drivers 235 allow the storage server 200 to communicate with storage devices, such as the storage device 130 in FIG. 1. The storage control module 234 may implement a disk storage protocol, such as RAID, while the storage drivers 235 may implement a lower level storage device access protocol, such as Fibre Channel or Small Computer System Interface (SCSI).

Also logically coupled to the file system 231 is a user interface layer 236, which generates a user interface such as a command line interface (CLI) or a graphical user interface (GUI), to allow administrative access to the storage server 200. Such administrative access may be done via an input/output terminal connected to the storage server 200 either directly (e.g., through a serial link) or via a network. Among other operations, the user interface 236 allows a user, such as a network administrator, to enable or disable an option for read-after-write verification, independently for each of the volumes of data maintained by the storage server 200. This enabling/disabling may be done, for example, by checking/unchecking a checkbox for a particular volume in a GUI to enable read-after-write verification for that volume. Each volume maintained by the storage server may have such a checkbox displayed in the GUI. If the option is enabled for a particular volume, then read-after-write verification will be performed by the storage server 200 for any writes directed to that volume.

Figure 3:
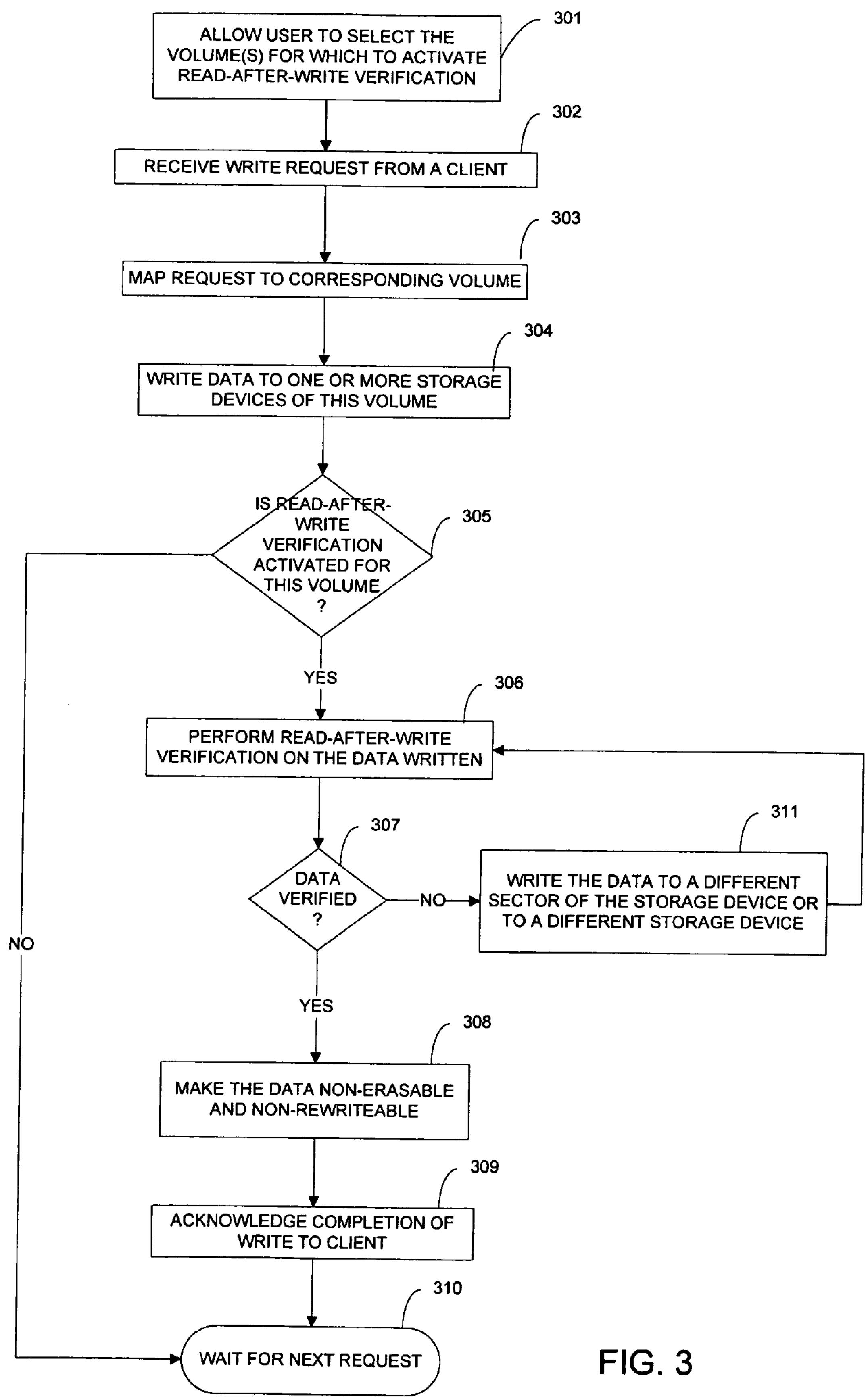
FIG. 3 illustrates a flow diagram of one embodiment of a process to perform read-after-write verification in a WORM system.

FIG. 3 illustrates a process to perform read-after-write verification in a WORM system in the storage server, such as storage server 110, in accordance with embodiments of the invention. The process is performed by processing logic in the storage server that may include hardware (e.g., circuitry, dedicated logic, etc.), software (such as is run on a general-purpose computer system or a dedicated machine, such as the storage server 110 in FIG. 1), or a combination of both.

At 301 a user is allowed (e.g., via the user interface 236) to select the volume(s) for which to activate read-after-write verification. As noted above, this may entail the user's checking a checkbox, displayed in a GUI, for each volume for which he wishes to require read-after-write verification. At 302 the storage server receives a write request from a client (e.g., one of the clients 140 in FIG. 1), with data to be written to persistent storage. At 303 the request is then mapped by the file system 231 (FIG. 2B) to the volume that contains the record (e.g., file) to which the request is directed, i.e., the target volume is identified. The data is then written at 304 to one or more of the magnetic storage devices which represent the target volume. In one embodiment, the storage control layer 234 (FIG. 2B) determines the particular storage devices to which the data is written, based on the target volume.

The process then determines at 305 whether read-after-write verification is activated (enabled) for the volume to which the request was directed, by checking whether the above-mentioned option was selected for that volume. In alternative embodiments, the process can determine whether to perform read-after-write verification based on any other available information relating to the context of the write, such as the user who is requesting the write, etc. In some applications, only certain predetermined types of records (e.g., security trading records) have to be stored in a storage device complying with the SEC rules.

If read-after-write verification is not activated for that volume (305), then the process simply ends, by waiting for the next request from a client at 310. If read-after-write verification is activated for that volume, then read-after-write verification is executed at 306. There are multiple ways this can be accomplished, as described further below.

If the verification is not successful (307) (e.g., there was a write error), then at 311 the process writes the data to a different sector of the storage device or to a different storage device (depending on the amount of data for which the verification failed), and the process then loops back to 306. Typically, if the verification fails it is because of defects on the surface of the magnetic storage media. Therefore, other conventional corrective measures may alternatively be used to solve the problem, such as swapping the defective magnetic storage device with a spare magnetic storage device.

If the verification is successful (307), then the written and verified data is designated non-erasable and non-rewriteable by the file system 231, i.e., the data is placed in WORM state. In that case, the file system 231 will not allow the data to be written again during the applicable retention period. At this point (i.e., only after verification is successful) the storage server sends acknowledgement of completion of the write to the client, at 309. The process then ends at 310.

The capability embodied in this process enables magnetic storage devices to comply with the Rule promulgated by the SEC. Furthermore, since verification is performed automatically after writing the data to the magnetic storage device and before acknowledging completion of the write, the accuracy of the verification is improved and the latency in discovering a problem with the data written is shortened. Moreover, such capability relieves the user of the responsibility of choosing and setting a frequency at which to periodically perform verification on the data stored in the magnetic storage devices, hence making the system more user-friendly.

In some embodiments, a magnetic storage device to which the data is written may not be capable of performing read-after-write verification (306) by itself, as may be the case with an Advanced Technology Attachment (ATA) disk, for example. In such an embodiment, the read-after-write verification can be accomplished by reading the written data back from the magnetic storage device into the storage server and comparing the data read back with the data that was intended to be written in the storage server. If the data read back is identical the data intended to be written, then the verification is considered successful. Otherwise, the verification is considered unsuccessful (failed).

In other embodiments, the magnetic storage device is capable of performing read-after-write verification (306) by itself, such as in the case of a Small Computer System Interface (SCSI) disk. In such an embodiment, the storage server (more specifically, the storage drivers 235) may send a "write-and-verify" command or the like to the magnetic storage device to cause the magnetic storage device to write the data and to perform the verification. In other words, operations 304 and 306 of FIG. 3 are initiated by a single command. In response to the command, a controller within the magnetic storage device reads back the written data and compares the read back data with the data intended to be written. If the data read back is identical to the data intended to be written, then the verification is considered successful. Otherwise, the verification is considered unsuccessful (failed).

The granularity of the read-after-write verification can vary across different embodiments. In one embodiment, data is written and verified in units of files. In addition, in some embodiments it may be desirable to verify not only actual data, but also metadata relating to stored data. For example, it may be desirable to verify the directory structure in which the data is stored. This can be done using read-after-write verification in essentially the same manner as described above.

Referring back to FIG. 3, if the read-after-write verification fails, then processing logic writes the data to a different sector of the magnetic storage device or to a different magnetic storage device (processing block 370) and then repeats processing block 350.

Thus, a method and apparatus to perform read-after-write verification for improved WORM data storage have been described.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

"Logic", as is used herein, may include, for example, software, hardware and/or combinations of hardware and software.

References throughout this specification to "one embodiment" or "an embodiment" mean that a particular feature, structure or characteristic described in connection with the embodiment is included in at least one embodiment of the present invention. Therefore, it is emphasized and should be appreciated that separate references in this specification to "an embodiment", "one embodiment" or "an alternative embodiment" are not necessarily all referring to the same embodiment. However, such references also are not necessarily mutually exclusive. Hence, the particular features, structures or characteristics being referred to may be combined as suitable in one or more embodiments of the invention, as will be recognized by those of ordinary skill in the art.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:

providing a user interface, in a file-based networked storage server, to enable a user to selectively enable or disable an option to require read-after-write verification individually for each of a plurality of sets of data stored by the file-based networked storage server;

receiving from a client a request to perform a write of specified data;

writing the specified data to a magnetic storage device managed by the file-based networked storage server in response to the request;

determining whether the specified data is associated with a set of data, of said plurality of sets of data, for which said option to require read-after-write verification is enabled;

if the specified data is associated with a set of data, of said plurality of sets of data, for which said option to require read-after-write verification is enabled, then verifying the specified data written to the magnetic storage device, prior to, and as a precondition of, acknowledging completion of the write of the specified data to the client; and designating the specified data written to the magnetic storage device as being in a WORM state only after successful completion of said writing and said verifying.

2. A method as recited in claim 1, wherein said verifying comprises:

reading back the specified data from the magnetic storage device into the file-based networked storage server; and in the file-based networked storage server, comparing the specified data read back with the data written to verify that the data read back is identical to the specified data written.

3. A method as recited in claim 1, further comprising sending a write-and-verify command to the magnetic storage device, wherein the magnetic storage device performs said verifying.

4. A method as recited in claim 1, further comprising performing read-after-write verification of a directory structure with which the specified data is associated.

5. A method as recited in claim 1, wherein the file-based network storage server; provides the client with file-level access to stored data.

6. A method as recited in claim 1, further comprising checking context of the specified data written to determine whether to perform the verification.

7. A method as recited in claim 1, wherein said providing a user interface comprises allowing users to select any of a plurality of volumes for which to enable read-after-write verification.

8. A method as recited in claim 7, wherein said determining comprises determining whether the specified data is part of a volume for which said option to require read-after-write verification is enabled.

9. A method as recited in claim 1, wherein each of the sets of data, of said plurality of sets of data, is a volume of data.

10. A storage server comprising:

a processor;

a network adapter through which to communicate with a client;

a storage adapter through which to access a plurality of magnetic storage devices;

a file system to manage a plurality of stored files stored in the plurality of magnetic storage devices;

a user interface to enable a user to selectively enable or disable an option to require read-after-write verification individually for each of a plurality of sets of data stored by the storage server in the plurality of magnetic storage devices; and memory storing software which, when executed by the processor, causes the storage server to execute a read-after-write verification process that includes:

receiving from the client a request to perform a write of specified data; writing the specified data to a magnetic storage device of the plurality of magnetic storage devices in response to the request;

determining whether the specified data is associated with a set of data, of said plurality of sets of data, for which said option to require read-after-write verification is enabled;

if the specified data is associated with a set of data, of said plurality of sets of data, for which said option to require read-after-write verification is enabled, then causing the specified data written to the magnetic storage device to be verified, prior to, and as a precondition of, acknowledging completion of the write to the client; and designating the specified data written to the magnetic storage device as being in a WORM state only after successful completion of said writing and said verifying.

11. A storage server as recited in claim 10, wherein said causing the specified data written to the magnetic storage device to be verified comprises:

reading back the specified data from the magnetic storage device into the storage server; and in the storage server, comparing the data read back with the specified data written to verify that the specified data read back is identical to the data written.

12. A storage server as recited in claim 10, wherein the read-after-write verification process further comprises sending a write-and-verify command to the magnetic storage device, wherein the magnetic storage device verifies the specified data.

13. A storage server as recited in claim 10, wherein the read-after-write verification process further comprises causing read-after-write verification of a directory structure with which the specified data is associated to be performed.

14. A storage server as recited in claim 10, wherein the storage server provides the client with file-level access to stored data.

15. A storage server as recited in claim 10, wherein the read-after-write verification process further comprises checking context of the specified data written to determine whether to perform the verification.

16. A storage server as recited in claim 10, wherein said providing a user interface comprises allowing users to select any of a plurality of volumes for which to enable read-after-write.

17. A storage server as recited in claim 16, wherein said determining comprises determining whether the specified data is part of a volume for which said option to require read-after-write verification is enabled.

18. A storage server as recited in claim 10, wherein each of the sets of data, of said plurality of sets of data, is a volume of data.

19. An apparatus comprising:

a processor;

means for selectively specifying individually whether read-after-write verification is to be performed for each of a plurality of sets of data stored by a file-based networked storage server;

means for receiving from a client a request to perform a write of specified data;

means for writing the specified data to a magnetic storage device managed by the file-based networked storage server in response to the request;

means for determining whether the specified data is to be subject to read-after-write verification;

means for verifying the specified data written to the magnetic storage device if the specified data is to be subject to read-after-write verification, prior to, and as a precondition of, acknowledging completion of the write to the client; and means for designating the specified data written to the magnetic storage device as being in a WORM state only after successful completion of said writing and said verifying.

20. An apparatus as recited in claim 19, where the means for determining whether the specified data is to be subject to read-after-write verification comprises means for determining whether a read-after-write verification option is enabled for the specified data.

21. A method comprising:

providing a user interface, in a file-based networked storage server, to enable a user to selectively enable or disable an option to require read-after-write verification individually for each of a plurality of volumes of data stored by the file-based networked storage server;

receiving from a client a request to perform a write of specified data;

mapping the request to a corresponding volume of the plurality of volumes;

writing the specified data to said volume in a magnetic storage device managed by the file-based networked storage server in response to the request, and thereafter, determining whether said option to require read-after-write verification is enabled for said volume;

if said option to require read-after-write verification is determined to be enabled for said volume, then verifying the specified data written to the magnetic storage device, prior to, and as a precondition of, acknowledging completion of the write to the client; and designating the specified data written to the magnetic storage device as being in a WORM state only after successful completion of said writing and said verifying.

* * * * *